S. W. BARNABY.
NAVAL DESTROYER CRAFT.
APPLICATION FILED JUNE 13, 1912.

1,054,490.

Patented Feb. 25, 1913.

Witnesses.

Inventor.
S. W. Barnaby.
By A. S. Pattison
Atty.

UNITED STATES PATENT OFFICE.

SYDNEY WALKER BARNABY, OF WOOLSTON, ENGLAND, ASSIGNOR TO JOHN I. THORNYCROFT & CO. LIMITED, AND SYDNEY WALKER BARNABY, BOTH OF WOOLSTON, ENGLAND.

NAVAL DESTROYER-CRAFT.

1,054,490. Specification of Letters Patent. Patented Feb. 25, 1913.

Application filed June 13, 1912. Serial No. 703,472.

*To all whom it may concern:*

Be it known that I, SYDNEY WALKER BARNABY, a subject of the King of Great Britain and Ireland, residing at Woolston, in the county of Hants, England, have invented an Improvement in Naval Destroyer-Craft, of which the following is a specification.

As is well known, vessels such as battleships and passenger ships have been fitted with tank arrangements designed so that liquid contained therein can be utilized to minimize rolling of the vessel.

Heretofore it has been impracticable to apply anti-rolling tanks of this character to naval destroyer craft by reason of the additional weight and consequent load imposed upon the vessel. Where, however, as in torpedo boat destroyers for example, liquid fuel is employed, it is possible to make use of this liquid for the purpose referred to, and it is the object of the present invention to enable this to be done in an effectual manner by arranging that the ordinary oil tanks which are charged with oil for use in times of peace but, being above the water line, would be emptied before going into action, shall constitute an anti-rolling tank, the oil in such tank being relied upon to secure the required damping action at times of peace whereas in war times it is to be replaced with water.

Figure 1:
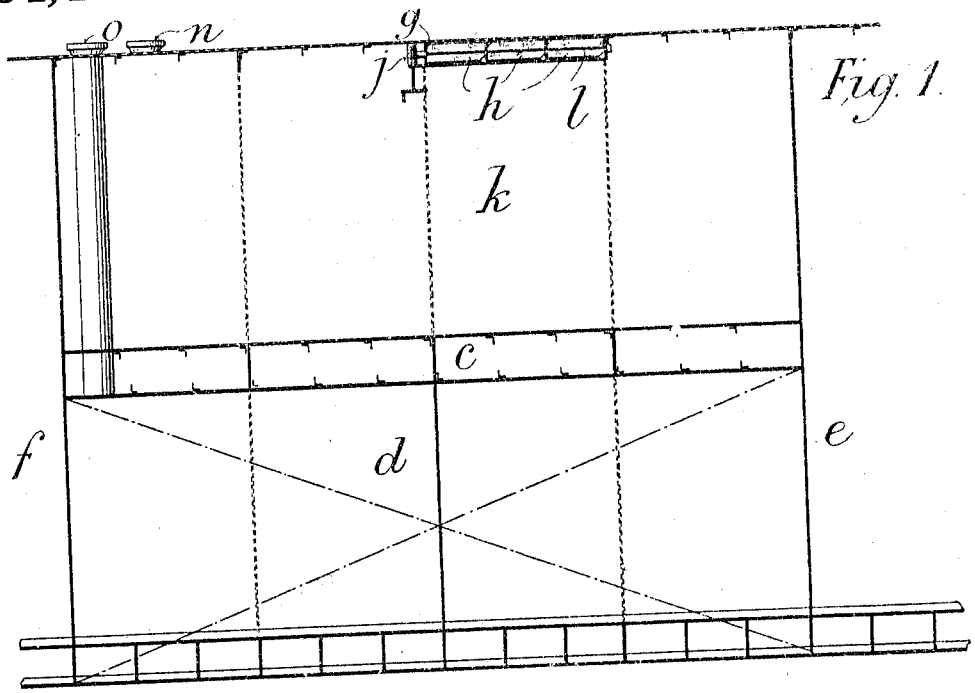
Figure 2:
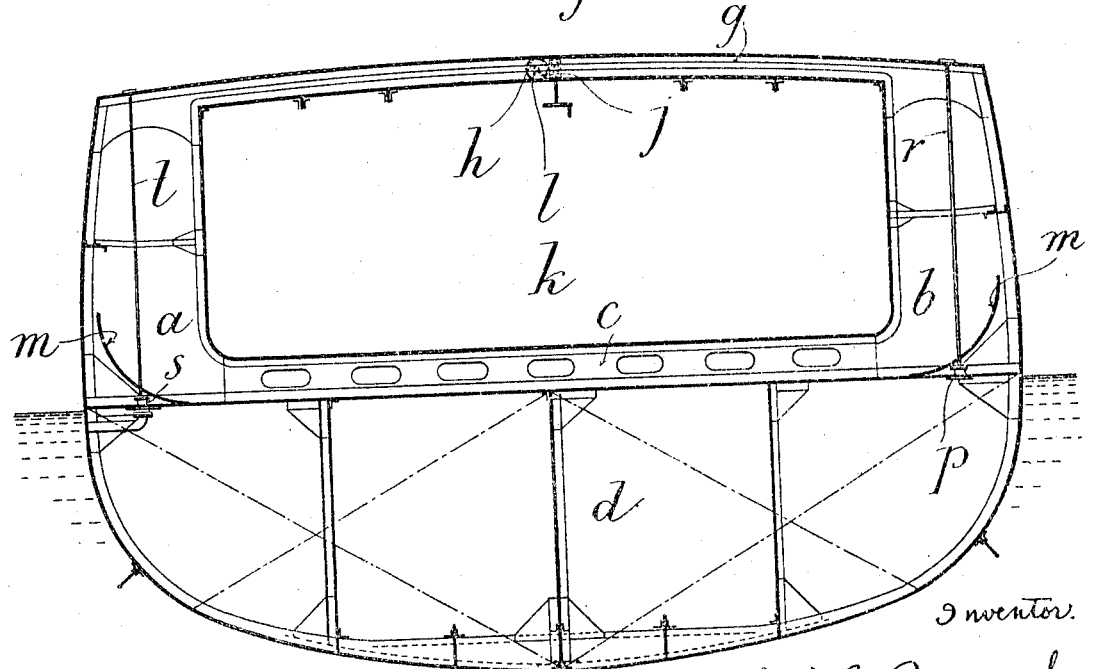

A part longitudinal section and a cross section of a torpedo boat destroyer embodying the invention are shown respectively in Figures 1 and 2 of the accompanying drawings.

As there shown, the anti-rolling tank comprises two longitudinal reservoirs $a$ and $b$, (usually called the peace oil tanks) which are connected together at the bottom by a suitably constructed transverse passage $c$, in a manner previously adopted in other classes of ships, to form an anti-rolling tank, the said reservoirs $a$ and $b$ and passage $c$ being disposed above a separate fuel tank $d$ (usually called the war oil tank) located between say the boiler-room $e$ and the engine room $f$. The air space within the upper part of each of the reservoirs $a$ and $b$ constituting the anti-rolling tank, may be placed in communication with each other through a transverse passage $g$ immediately beneath say the upper deck, the said passage being of a comparatively restricted cross sectional area and capable of being modified with the aid of a suitable valve arrangement as heretofore. Conveniently, the valve arrangement may comprise butterfly valves $h$ upon a spindle $l$ operated through worm and worm wheel gearing $j$ from the space $k$ between the side reservoirs $a$ and $b$, this space accommodating say the dynamo and store rooms. By this means the cross sectional area of the passage $g$ can be readily altered to adapt the combined tanks with liquid for both use as an antirolling tank when charged with oil and when charged with water, the cross sectional area of the passage requiring to be considerably reduced when the tanks are charged with water as compared with the area required when they are charged with oil, in order to obtain the required damping effect in each case, the viscosity of the two liquids being very different. Each side reservoir $a$ and $b$ may be fitted with a curved guide plate $m$ serving to direct the liquid gradually to the outer side of the reservoir as the vessel rolls. The level of the liquid in these reservoirs would usually be about half way up to the upper deck.

In addition to the usual means for charging the reservoirs $a$ and $b$ and the war tank $d$ with oil fuel, represented as trunks $n$, $o$ respectively, means, such as a valve $p$ which can be controlled from the deck by the spindle $r$ may be provided for permitting the contents of the connected reservoirs $a$ and $b$ to be emptied into the tank $d$. A similar valve $s$ worked by a spindle $t$ is provided for discharging the contents of the reservoirs $a$ and $b$ through the hull of the craft into the external sea. The connected reservoirs $a$ and $b$ can be charged with water by means of a hose in connection with the vessel's fire service pump through the trunk $n$.

What I claim is:—

1. In a naval destroyer craft having a war oil tank in the lower part of the vessel below the water line, the combination with peace oil tanks arranged at the sides of the vessel above the water line and normally separate from the war oil tank and a transverse passage connecting the peace oil tanks together thereby causing them to act as anti-rolling tanks, of means adapted to permit oil in the connected peace oil tanks to be emptied into the war oil tank when the vessel is to be brought into action and to be replaced with water.

2. In a naval destroyer craft having a war oil tank in the lower part of the vessel below the water line, the combination with peace oil tanks arranged at the sides of the vessel above the water line and normally separate from the war oil tank and a transverse passage connecting the peace oil tanks together thereby causing them to act as anti-rolling tanks, of means adapted to permit oil in the connected peace oil tanks to be emptied into the war oil tank when the vessel is to be brought into action and to be replaced with water, and means for discharging the water from the peace oil tanks to the exterior of the craft when these tanks are to be again charged with oil.

3. In a naval destroyer craft having a war oil tank in the lower part of the vessel below the water line, the combination with peace oil tanks arranged at the sides of the vessel above the water line, normally separate from the war oil tank and connected by a lower transverse passage and by a higher transverse passage of a more restricted character and the cross sectional area of which can be varied, of means adapted to permit oil in the peace oil tanks to be emptied into the war oil tank when the vessel is to be brought into action and to be replaced with water.

4. In a naval destroyer craft having a war oil tank in the lower part of the vessel below the water line, the combination with peace oil tanks arranged at the sides of the vessel above the water line, normally separate from the war oil tank and connected by a lower transverse passage and by a higher transverse passage of a more restricted character and provided with a regulating valve by which its cross sectional area can be varied, of means adapted to permit oil in the peace oil tanks to be emptied into the war oil tank when the vessel is to be brought into action and to be replaced with water, and means for discharging the water from the peace oil tanks to the exterior of the craft when these tanks are to be again charged with oil.

Signed at the American consulate, Southampton, England, this fourth day of June 1912.

SYDNEY WALKER BARNABY.

Witnesses:
HARVEY J. BAVERSTOCK,
CHARLES PACK.